United States Patent [19]
Hoehn

[11] 3,955,463
[45] May 11, 1976

[54] SCREW MOUNTING MEANS
[75] Inventor: Rudolph H. Hoehn, Queens, N.Y.
[73] Assignee: Slater Electric Inc., Glen Cove, N.Y.
[22] Filed: July 30, 1973
[21] Appl. No.: 384,012

Related U.S. Application Data

[63] Continuation-in-part of Ser. No. 170,052, Aug. 9, 1971, abandoned.

[52] U.S. Cl............................ 85/36; 151/41.76; 403/357
[51] Int. Cl.² ................. F16B 17/00; F16B 37/02
[58] Field of Search ............ 85/32 V, 36; 403/357, 403/356; 151/8, 23, 41.76

[56] References Cited
UNITED STATES PATENTS

| | | | |
|---|---|---|---|
| 771,966 | 10/1904 | Ball | 151/8 |
| 2,149,719 | 3/1939 | Arnest | 220/3.4 |
| 2,291,560 | 7/1942 | Rhodes | 403/357 |
| 2,293,615 | 8/1942 | Murphy | 287/53 H |
| 2,528,675 | 11/1950 | Tinnerman | 287/53 H |
| 2,751,105 | 6/1956 | Eipper | 220/3.3 |
| 2,867,349 | 1/1959 | Parker | 220/3.3 |
| 2,934,590 | 4/1960 | Thompson et al. | 174/53 |
| 2,940,782 | 6/1960 | Bengtson | 403/281 |
| 2,969,214 | 1/1961 | Torresen | 248/27 |
| 3,185,760 | 5/1965 | Despard | 174/54 |
| 3,388,934 | 6/1968 | Chapman et al. | 403/357 |
| 3,392,943 | 7/1968 | Baxter | 248/27 |
| 3,403,215 | 9/1968 | Slater et al. | 174/53 |
| 3,403,216 | 9/1968 | Drapkin | 174/53 |
| 3,437,738 | 4/1969 | Wagner | 174/55 |
| 3,575,313 | 4/1971 | Trachtenberg et al. | 220/3.3 |
| 3,876,821 | 4/1975 | Pringle | 85/36 |

FOREIGN PATENTS OR APPLICATIONS

| | | | |
|---|---|---|---|
| 178,763 | 4/1922 | United Kingdom | 85/1 L |

Primary Examiner—Marion Parsons, Jr.
Attorney, Agent, or Firm—Morgan, Finnegan, Pine, Foley & Lee

[57] ABSTRACT

A screw mounting clip member is adapted to be slidably fixedly engaged in a slotted aperture adjacent an unthreaded screw-receiving borehole. A spring detent member provided on the clip extends into the borehole when the clip is fixedly mounted in place. A threaded screw is fastened in the borehole by initially being manually thrust endwise into the borehole without turning, thereby deflecting and forcefully engaging the spring detent with the screw threads. The screw may thereafter be tightened by turning the screw against the spring detent and may be unfastened only by reverse turning of the screw, in the conventional manner.

7 Claims, 9 Drawing Figures

INVENTOR.
RUDOLPH H. HOEHN
BY
Morgan, Finnegan, Durham & Pine
ATTORNEYS

SCREW MOUNTING MEANS

CROSS-REFERENCE TO RELATED APPLICATION

This application is a continuation-in-part of my copending application, Ser. No. 170,052 which was filed Aug. 9, 1971, now abandoned.

BACKGROUND AND OBJECTS OF THE INVENTION

The present invention relates generally to screw mounting means and relates more particularly to certain new and useful improvements in the quick mounting of screws, of utility especially in the fastening of threaded screws to moldable plastic materials.

It is often desirable to be able to form various relatively light load-bearing constructional members from a moldable plastic material, such as, for example, electrical outlet boxes. However, disadvantages are encountered when it is necessary to mount threaded screws in such members, as it is difficult to mold internal plastic threads and also because such threads tend to be easily "stripped," rendering the entire mounting member completely useless.

It has also previously been recognized that it is desirable to provide a quick and easy means for mounting threaded screws, such as in the fastening of an electrical outlet receptacle to an electrical outlet box. Prior proposals, however, either have not performed satisfactorily or have not been usable with moldable plastic materials, or have been so cumbersome or complex as to be economically impractical to manufacture and therefore not commercially feasible.

It is therefore an object of this invention to provide a new and improved screw mounting means.

Another object of this invention is to provide a new and improved screw mounting means which permits threaded screws to be quickly and easily mounted.

Another object of this invention is to provide a new and improved screw mounting means which permits threaded screws to be easily and quickly fastened to moldable plastic materials.

Another object of this invention is to provide a new and improved screw mounting means which overcomes the aforementioned diadvantages of the prior proposals for quick fastening screw mounting means.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

SUMMARY OF THE INVENTION

Briefly described, the present invention is directed to a new and improved screw mounting means which permits a threaded screw to be quickly and easily mounted in place and which also is particularly advantageous in permitting screw fastening devices to be used with moldable plastic materials.

In accordance with the invention, the screw-receiving borehole is unthreaded and is provided with a first axially extending slot in the wall thereof which communicates the borehole with a second slot extending adjacent and generally parallel to the borehole. A screw mounting clip member is slidably received and fixedly engaged within the second slot and includes a spring detent member which projects through the first slot into the borehole when the clip is mounted in place.

A threaded screw is advantageously quickly fastened within the borehole by initially being manually thrust endwise axially into the borehole without turning, whereupon the spring detent of the clip is deflected and forcefully engages the threads of the screw. Thereafter the screw is tightened down by turning it against the spring detent, and the screw may be removed only by reverse turning, in the conventional manner.

In a first embodiment of the invention, the aforementioned second slot includes a central portion of enlarged width having a shoulder extending thereacross intermediate the ends of the adjacent borehole. The clip member includes the aforementioned screw fastening spring detent member extending outwardly from one side thereof and also includes another clip-mounting spring detent member extending outwardly from the opposite side of the clip. The last mentioned spring detent cooperates with a stop member to fixedly engage the clip in the slot adjacent the screw-receiving borehole. In this embodiment, the clip member is assembled simply by sliding it into the slot extending adjacent the screw receiving borehole, whereupon the clip-mounting spring detent is deflected by the intermediate shoulder. As the free end of the spring detent moves past the shoulder, it "snaps" back into the slot, whereupon the stop member contacts the front face of the shoulder, thereby locking the clip in place with the screw-fastening spring detent member projecting into the screw-receiving borehole. Thereafter, a threaded screw may be mounted in the borehole as previously described.

In an alternate preferred embodiment of the invention, the clip mounting second slot includes a section of enlarged width at the end thereof adjacent the top end of the borehole, forming a pair of seats. The clip member is provided with a pair of ears at the end adapted to be received in the aforesaid seats and a pair of spring detent arms at the other end extending outwardly from the side of the clip opposite to that from which the fastening spring detent member extends. Thus, in this embodiment, the clip member is assembled by sliding it into the aforesaid second slot with the screw fastening spring detent member extending into the borehole, thereby deflecting the pair of clip-mounting spring detent arms, until the ears of the clip seat in the enlarged width portion of the slot, whereupon the detent arms move out of the mounting slot and "snap" outwardly against the back side of the wall in which the borehole is formed to lock the clip in place.

It will be apparent from the foregoing general description that the objects of the invention specifically enumerated herein are accomplished by the invention as herein embodied.

Thus, the configuration of the screw-receiving borehole and the adjacent slot for mounting the screw mounting clip can be molded by any suitable molding technique, such as compression or injection molding, permitting the use of the invention with moldable plastic materials. The construction of the associated screw mounting clip member is extremely simple, particularly in the preferred alternate embodiment, as is its installation, again contributing to an economically practical product. The provision of a spring detent member extending into the screw-receiving borehole permits a threaded screw to be essentially instantaneously manually thrust endwise into the borehole over substantially its entire length, requiring only a single turn or two for final tightening, resulting in a quick and easy fastening of a threaded screw. At the same time, the spring detent prevents endwise outward movement of the screw and the screw can only be removed by reverse turning, in the conventional manner.

It will be understood that the foregoing general description and the following detailed description as well are exemplary and explanatory of the invention but are not restrictive thereof. Thus, while the screw mounting clip member of this invention is particularly adapted to and was designed for use in the quick fastening of electrical outlet receptacles to electrical outlet boxes by threaded screws, the principles underlying the operation of the invention are not limited to such usage. However, since the invention is particularly adaptable to such usage, reference will be made hereinafter thereto in order to provide an example of a practical and useful embodiment of the invention.

The accompanying drawings, referred to herein and constituting a part hereof, illustrate the preferred embodiment of the invention, and together with the description, serve to explain the principles of the invention.

DESCRIPTION OF THE PREFERRED EMBODIMENTS

Figure 1:
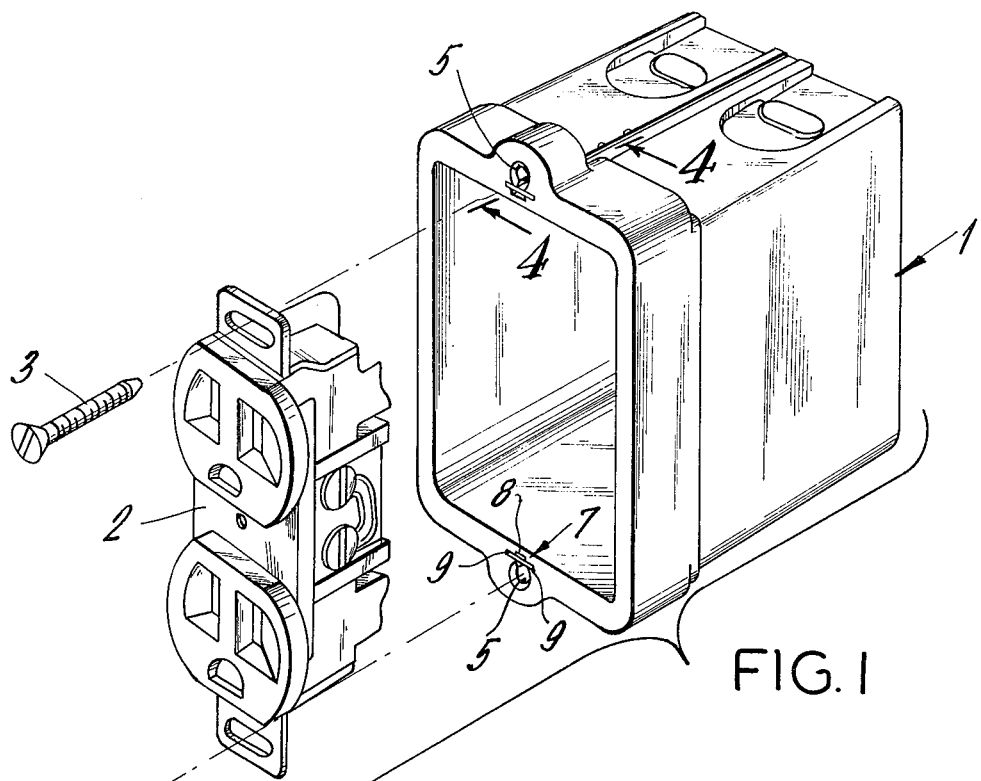
FIG. 1 is an exploded, perspective view of an electrical outlet box formed from a moldable plastic material and constructed in accordance with the invention, the view illustrating the assembly of a standard electrical outlet receptacle fastened to the outlet box by threaded screws.

Referring now more particularly to the embodiment of the invention shown in FIGS. 1–5 of the accompanying drawings, there is illustrated in FIG. 1 an electrical outlet box, indicated generally by reference numeral 1, advantageously formed from a suitable moldable plastic material, adapted to receive and support a suitable standard electrical outlet receptacle 2 mounted thereto by means of threaded screws 3.

In accordance with the invention, moldable plastic outlet box 1 is provided with screw mounting means which permit the threaded screws to be quickly and easily fastened thereto.

To this end, outlet box 1 is suitably molded so as to include in opposed side walls along the perimeter of its open end, opposed unthreaded boreholes 5. Each borehole 5 contains an axially extending slot 6 communicating the borehole with an adjacent, generally rectangular, slot extending parallel thereto, indicated generally by reference numeral 7, slot 7 adapted to slidably fixedly receive a screw mounting clip 20 therein, as more fully described hereinafter.

Advantageously, and as embodied in FIGS. 1–5, slot 7 includes a central portion 8 of enlarged depth and side portions 9 of relatively narrow depth. A shoulder 10 extending across the central portion 8 of slot 7 serves to fixedly mount clips 20 in slot 7, as will be seen from the following description.

Figure 2:
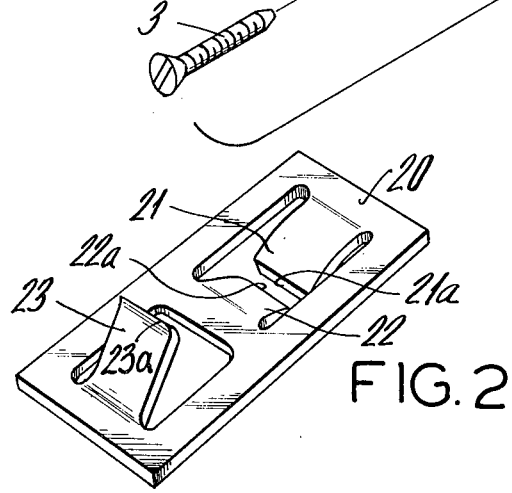
FIG. 2 is an enlarged perspective view of a screw mounting clip member constructed in accordance with the invention.
Figure 4:
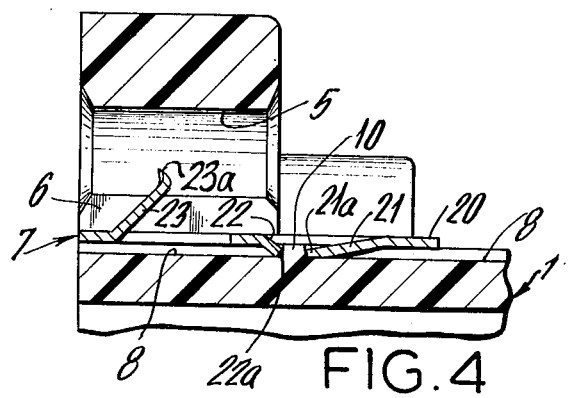
FIG. 4 is an enlarged, fragmentary sectional view taken along line 4—4 of FIG. 1, illustrating the screw mounting clip member of the invention fixedly mounted in place in the electrical outlet box, with its screw-fastening spring detent member projecting into a screw-receiving unthreaded borehole of the outlet box.
Figure 3:
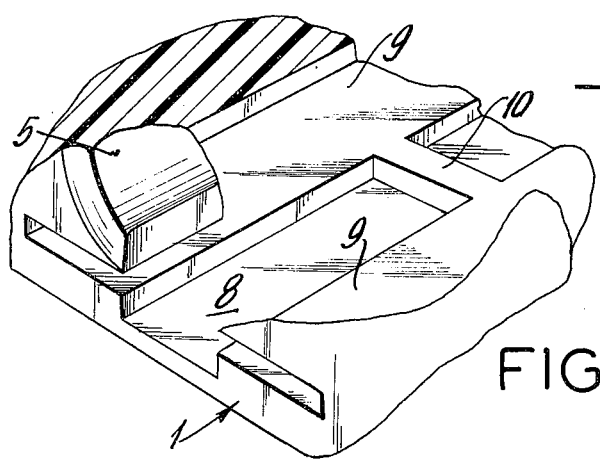
FIG. 3 is an enlarged, fragmentary perspective view of the outlet box of FIG. 1, illustrating the slotted aperture adjacent the screw-receiving borehole for slidably receiving and fixedly engaging the screw mounting clip member of the invention in the electrical outlet box.
Figure 5:
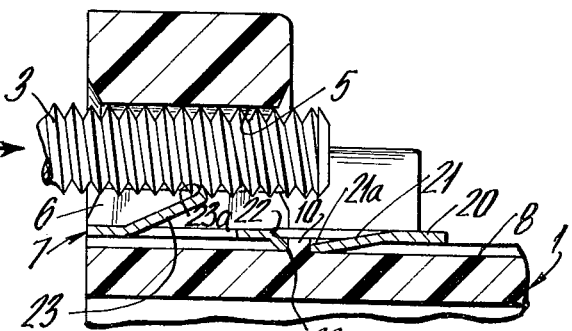
FIG. 5 is a view similar to that of FIG. 4, illustrating a threaded screw extending into the screw-receiving aperture of the outlet box and securely held therein by the deflected screw-fastening flange of the screw mounting clip.
Figure 6:
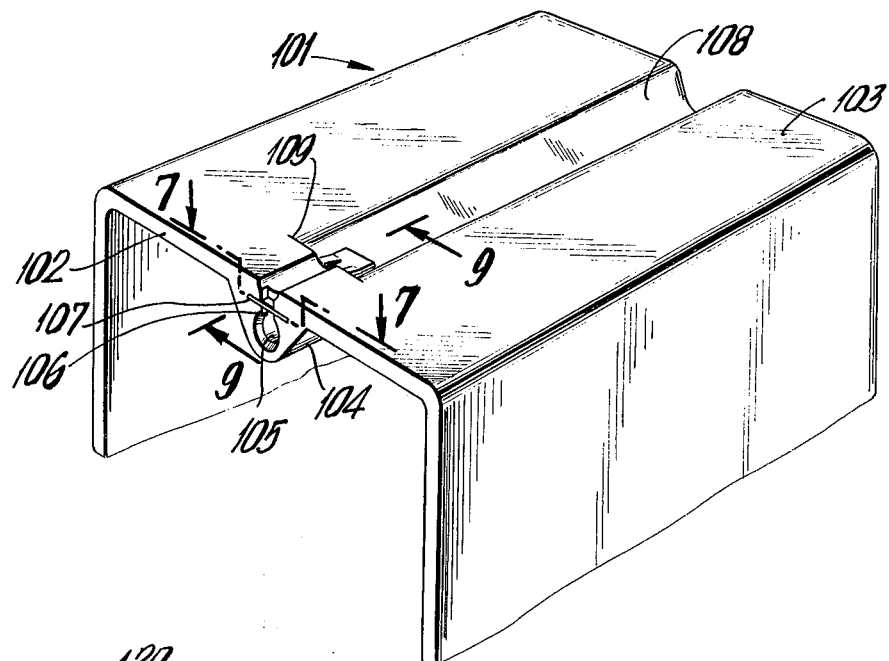
FIG. 6 is a partial perspective view of one end of an outlet box constructed in accordance with an alternate embodiment of the invention, and having mounted therein a mounting clip member also constructed in accordance with an alternate embodiment of the invention.

As best seen in FIG. 2, screw mounting clip 20 comprises a flat, relatively thin, rectangular member formed from a material, such as spring steel, which is substantially rigid but which yields or flexes under pressure. An elongated detent arm 21 is preferably formed integrally with clip 20 and extends angularly outwardly from one side thereof, terminating in a free end 21a which is in spaced, cooperating relationship with edge 22a of a short stop arm 22, also preferably formed integral with clip 20.

A separate, additional elongated, pawl-like detent arm 23 is also provided on clip 20, preferably integrally therewith, extending angularly outwardly from the side of clip 20 opposite that from which detent arm 21 and stop arm 22 extend. Detent arm 23 is adapted to forceably engage a threaded screw under spring pressure, as is more fully described hereinafter, and, to that end, its free end 23a is advantageously tapered and hooked so that it extends to the root of a threaded screw inserted into borehole 5 (see FIG. 5) to insure locking engagement between the screw and the detent arm 23.

It will be apparent from the foregoing description that the assembly and operation of the screw mounting means of the embodiment of the invention shown in FIGS. 1–5, as here illustrated in the environment of an electrical outlet receptacle mounted to an electrical outlet box, is as follows:

A screw mounting clip 20 is inserted into each of slots 7 formed in outlet box 1 with its clip-mounting spring detent arm 21 and cooperating stop arm 22 aligned with the enlarged depth portion 8 of slot 7 and its screw-fastening spring detent arm 23 aligned with slot 6 in borehole 5. In this position, the side edges of the clip are telescopically slidably received in the reduced depth side portions 9 of slot 7. Clip 20 is then slidably thrust into slot 7, whereupon detent arm 21 is deflected by shoulder 10. As the free end 21a of arm 21 slides past shoulder 10, arm 21 returns to slot 8 by spring action and at the same time stop arm 22 engages the front face of shoulder 10. Stop arm 22 prevents further inward movement of clip 20 and detent 21 prevents outward movement of clip 20 from slot 7. Clip 20 is thus locked in place in slot 7 with its outer edge flush with the outer end of outlet box 1 and its screw-fastening spring detent arm 23 extending into borehole 5 (see FIGS. 4 and 5).

Thereafter, receptacle 2 is advantageously quickly mounted to box 1 by manually thrusting each of the threaded screws 3 endwise into the respective boreholes 5 without turning, whereupon the respective spring detent arms 23 are deflected and forcefully engage the threads of the screws. Screws 3 are advantageously thrust into boreholes 5 as far as possible without turning, and are thereafter tightened down by being turned against the spring force of detents 23 with a screwdriver or the like until tightly secured within the boreholes. It has been found that the tightening operation requires only about one or two turns of the screwdriver. Thereafter, the screws may be removed only by reverse turning, in the conventional manner.

It will be seen that spring detent arm 23 of clip 20 extends angularly outward therefrom in a direction inward of borehole 5 when clip 20 is mounted into place. Thus, arm 23 bends under inward axial movement of a threaded screw into borehole 5, but wedges against the screw threads to prevent axial outward movement of the screw, except by reverse turning. It will be understood that arm 23 therefore must be formed from material which is sufficiently flexible to permit a slight bending thereof but which is sufficiently rigid so that it will not buckle under an axial outward force.

Referring now more particularly to FIGS. 6-9 of the accompanying drawings, there is illustrated a preferred alternate embodiment of the invention, in which the various stamped and molded parts of the invention are less complicated and easier to manufacture than in the embodiment of FIGS. 1-5.

Thus, outlet box 101 is provided having identical but opposing end surfaces 103 and a top surface 102. End surface 103 contains an indentation 108 extending longitudinally thereon and terminating in a transverse surface 109. The inner side of each of the ends 103 is constructed with a boss 104 extending inwardly therefrom adjacent top surface 102 which is provided with an unthreaded borehole 105. A substantially rectangular slot 107, constructed to receive the screw mounting clip, extends parallel to borehole 105 in boss 104 and terminates therewith at transverse surface 109. An additional slot 106 is provided which communicates and is coterminous with borehole 105 and rectangular slot 107.

Figure 8:
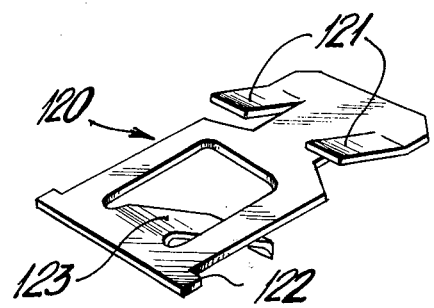
FIG. 8 is an enlarged perspective view of the alternate screw mounting clip member shown in FIG. 6.
Figure 9:
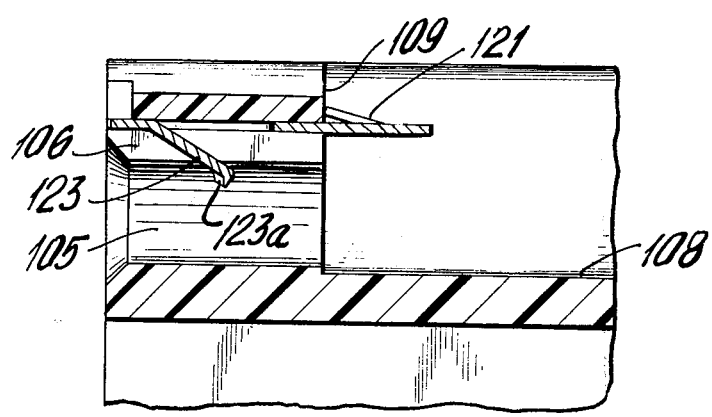
FIG. 9 is a partial cross-sectional view of the outlet box taken along line 9—9 in FIG. 6.

As best seen in FIG. 8, screw mounting clip 120 comprises a flat, substantially rectangular member formed by stamping or other suitable means from spring steel or the like. Similarly to the first described embodiment, clip 120 is formed having a pawl-like detent arm 123 extending angularly inwardly through slot 106 into borehole 105 when the clip is secured in slot 107, the free end of arm 123 advantageously being tapered and hooked as shown at 123a.

Also formed on clip 120 is a clip-mounting spring detent means, advantageously comprising a pair of spring detent arms 121 which extend angularly outwardly from the side of clip 120 opposite that from which the fastening spring detent arm 123 extends.

Alternatively, it will be understood that the pair of spring detent arms 121 could suitably be replaced with equally satisfactory results by a single detent arm provided centrally of the clip similar to the manner in which pawl arm 123 is provided.

Figure 7:
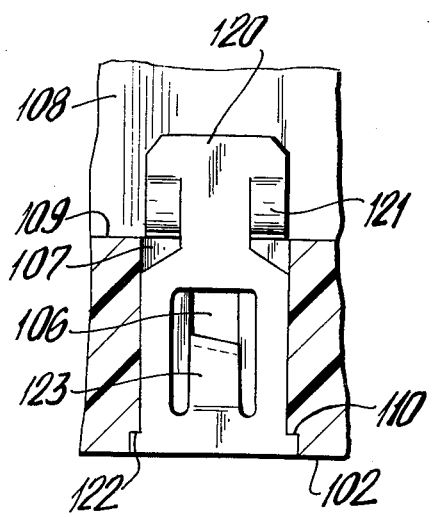
FIG. 7 is a partial cross-sectional view along line 7—7 in FIG. 6, showing the means by which the clip member shown in FIG. 6 is locked in place.

Thus, when clip 120 is fully inserted into slot 107, arms 121 extend out of said slot and spring or "snap" into engagement with the backside surface 109 of the wall in which borehole 105 is formed. In order to prevent further downward movement of the clip, and thus lock the clip in place in slot 107, clip 120 is provided with ears 122 which are received in corresponding seats 110 provided by the enlarged width portion of the upper end of slot 107, as best seen in FIG. 7.

It will thus be seen that the operation of this embodiment is substantially identical to the embodiment illustrated in FIGS. 1-5, except for the means by which the clip 120 is fixedly installed in slot 107. In that regard, it will be seen that the locking means of this embodiment is provided by the engagement of ears 122 and seats 110 in cooperation with the engagement of detent arms 121 and transverse surface 109.

It will be understood that the invention is not limited to the use of any particular materials for its successful operation. Thus, while particularly advantageous where a threaded screw is to be mounted to a moldable plastic material, the screw mounting clip of this invention provides a quick and easy screw mounting means equally satisfactory with other materials. Also, while the screw mounting clip of the invention has been found to give satisfactory results when constructed of spring steel, it will be understood that other equivalent materials may also be used.

The invention in its broader aspects is not limited to the specific embodiments herein shown and described but departures may be made therefrom within the scope of the accompanying claims, without departing from the principles of the invention and without sacrificing its chief advantages.

What is claimed is:
1. Threaded screw mounting means comprising:
   a screw mounting member;
   a screw-receiving unthreaded borehole formed in said mounting member;
   a first axially extending slot formed in the wall of said borehole;
   a second slot formed in said mounting member adjacent said borehole and extending generally parallel thereto, said second slot including an enlarged width portion extending to the top of said borehole and forming a pair of laterally opposed seats in said second slot,
   said first slot communicating said borehole with said second slot;
   a generally flat clip member slidably lockably received in said second slot, said clip member including
      a yieldable pawl arm struck from said clip member at one end thereof and extending angularly through said first slot into said borehole and inwardly thereof,
      a pair of laterally opposed ears formed on said clip member received by said seats when said clip member is lockably received in said second slot,
      yieldable detent means struck from said clip member at the end thereof opposite said yieldable pawl arm, said detent means extending outwardly from the side of said clip member opposite that from which said yieldable pawl arm extends and angularly in a direction opposite to the direction of movement of said clip member so as to be deflected as said clip member is slidably inserted into said second slot, said yieldable detent means further extending beyond the bottom end of said second slot and bearing against the backside of said screw mounting member when said ears are located in said seats; whereby said clip member is locked in said second slot when said ears are received in said seats and said yieldable detent means bears against the backside of said screw mounting member, and said pawl arm yields to inward axial movement of a threaded screw into said borehole but wedges against the screw threads to prevent outward axial movement of the screw.

2. Threaded screw mounting means as claimed in claim 1, wherein said screw mounting member is formed from a moldable plastic material.

3. Threaded screw mounting means as claimed in claim 1, wherein said yieldable detent means comprises a pair of spring arm members.

4. Threaded screw mounting means as claimed in claim 1, wherein said pawl arm is a spring member and is spring-biased against said threaded screw, whereby said screw may be tightened into and removed from said borehole by turning against the spring pawl arm.

5. Threaded screw mounting means as claimed in claim 4 wherein said laterally opposed ears are formed at one end of said clip member opposite said detent means and said laterally opposed seats are provided at the end of said second slot adjacent the top of said borehole.

6. Threaded screw mounting means as claimed in claim 4, wherein said clip member is formed from spring steel and said spring pawl arm is formed integrally with said clip member.

7. Threaded screw mounting means as claimed in claim 4, wherein the end of said spring pawl arm is provided with a tapered hook which is adapted to extend to the root of the threads on a screw inserted into said borehole.

* * * * *